F. L. LANDERGREN.
COFFEE URN.
APPLICATION FILED MAR. 11, 1911.
1,037,269.
Patented Sept. 3, 1912.
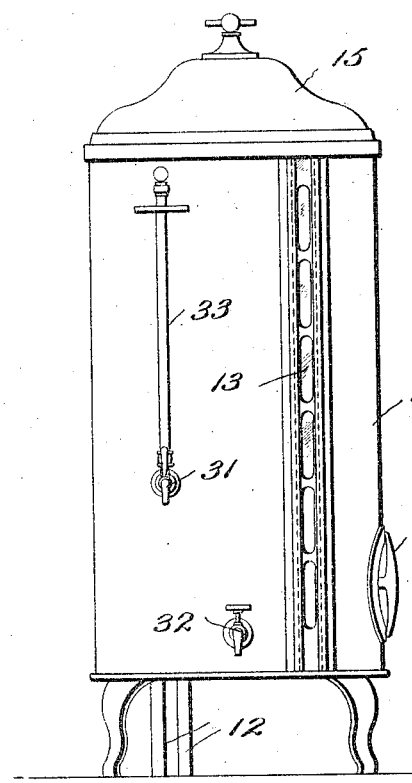
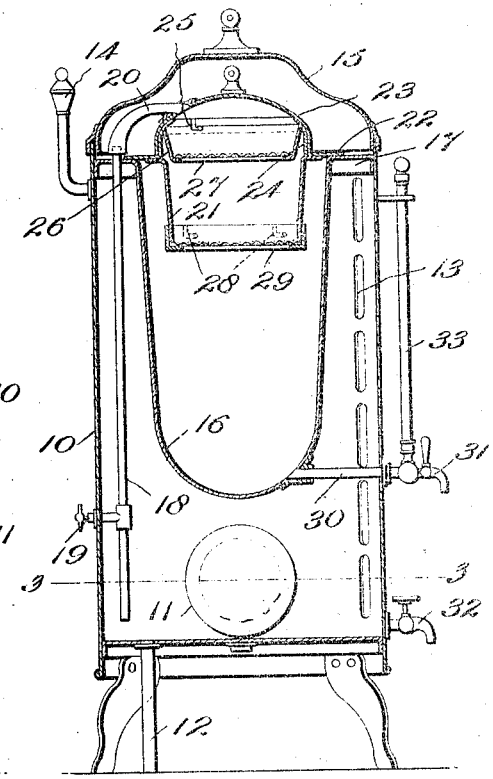
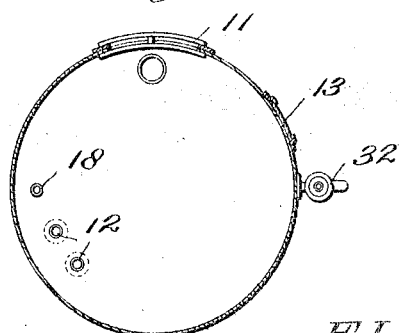
Witnesses
Inventor
F. L. Landergren,
by Wilkinson, Fisher & Witherspoon
Attorneys

UNITED STATES PATENT OFFICE.

FRANK L. LANDERGREN, OF NEW YORK, N. Y.

COFFEE-URN.

1,037,269. Specification of Letters Patent. Patented Sept. 3, 1912.

Application filed March 11, 1911. Serial No. 613,902.

*To all whom it may concern:*

Be it known that I, FRANK L. LANDERGREN, a citizen of the United States, residing at New York, in the county of New York and State of New York, have invented certain new and useful Improvements in Coffee-Urns; and I do hereby declare the following to be a full, clear, and exact description of the invention, such as will enable others skilled in the art to which it appertains to make and use the same.

The present invention relates to an improved compact form of coffee urn, the construction of which facilitates the removal and the separation of the parts of the percolator and insures keeping the coffee at a maximum temperature by direct contact between the hot water used to make the coffee and the exterior of the coffee tank.

It is one object of my invention to produce a coffee urn of the character described consisting of few parts and capable of being made at a very reasonable cost.

Another object of the invention is to produce a coffee urn of the character described which shall deliver coffee boiling hot and always free from sediment.

One embodiment of my invention is shown in the accompanying drawings wherein—

Figure 1 is a side elevation of the urn. Fig. 2 is a vertical sectional view of the same and Fig. 3 is a horizontal section of the view taken on the plane 3—3 of Fig. 2.

The main or outer casing or vessel is shown in cylindrical form in the drawings at 10, being provided with a hand hole 11, supply pipes 12 for steam and water, and a glass water gage 13. It is into this vessel 10 that the fresh water is first introduced, where it is heated either by steam or in any other well known manner. In order to prevent the development of an excessive steam pressure within the apparatus, I prefer to use a safety valve 14 of any well known construction. The top of the casing 10 is surmounted by a suitable cover 15.

Within the casing 10 is the coffee tank 16 so located as to be continually kept boiling hot by direct contact with the boiling water and steam in said casing 10. The tank 16 is preferably circular in cross section and is provided with an annular flange 17 which is riveted or otherwise suitably secured to the casing 10, so as to serve both to support the tank 16 and to confine the steam and water within the casing 10.

The vertical pipe 18, provided with a valve 19 dips under the water in the casing 10 and passes up through the flange 17. Over the top of this pipe there closely fits the flared end of the delivery pipe 20, leading into and rigidly attached to the cover of the percolator. The coupling between the pipes 18 and 20 is such that the pipe 20 may be readily removed merely by lifting off the cover of the percolator. The percolator preferably consists of a vessel 21 having a horizontal annular flange or supporting member 22 and a cover 23, tightly fitting over the upwardly projecting flange 24 of said vessel 21. I prefer to attach the cover 23 to the percolator 21 by the bayonet slot and pin fastening 25, the pin being outside of vessel 21. Underneath the cover 23 there is fastened a deep distributing tray 26 whose depending portion goes inside of the flange 24 of the vessel 21. The bottom of this tray 27 is made of perforated sheet metal or wire mesh, and is intended to distribute and sprinkle the water over the coffee below. This distributing tray is preferably removable from the inside of the cover.

To the bottom of the vessel 21 there is attached, by a bayonet joint 28, a sieve whose bottom is preferably composed of appropriate stretched gauze 29, whereby the grounds of coffee are supported during the operation of the device.

From the coffee tank 16 there extends a pipe 30 through which the coffee may be drained through the tap 31. I prefer to so place the pipe 30 that a certain portion of the depth of the coffee tank will be below the point of exit through said pipe, and in this way I prevent any sediment from being drawn off with the coffee.

Hot water may be drawn off through the tap 32.

The tube 33 is of glass and serves to indicate the level of the coffee within the tank 16.

The pressure of the steam developed in the main vessel 10 forces the water from said vessel up through the pipe 18, when the valve 19 is open, and over by the pipe 20 into the top of the percolator, where it is sprinkled over the ground coffee on top of the sieve below and finds its way through the grounds into the tank 16.

It will be seen that, since the coffee tank 16 in which the coffee is stored as fast as it is made is always in direct contact with the boiling water and steam in the main vessel 10, the coffee will always be kept boiling hot. It will also be seen that, on removing the cover 15, the entire percolator, together with the pipe 20, can be lifted right out of the apparatus; after which the cover 23 may be easily removed by turning it slightly so as to liberate the pin from the bayonet slot. In the same manner the tray 26 can be removed from the cover. Thus the cleaning of the percolator, the changing of its parts and the renewal of the coffee may be accomplished with the greatest ease.

Various changes may be made in this device without departing from my invention and I do not limit myself to the details herein shown and described.

What I claim is:

In a coffee urn, the combination of an outer vessel 10; pipe 12 connecting with the bottom of said vessel for delivering water within the vessel; a tank 16 located wholly within the vessel and spaced from the bottom and sides thereof; said tank constructed with an annular flange at the upper edge thereof securing the same to the vessel; a vertically disposed pipe 18 rigidly secured to the wall of the outer vessel, and passing through and projecting slightly above the annular flange 17 of the tank; a percolator consisting of a vessel 21 having an annular supporting flange 22 resting upon the annular flange 17 of the tank, and having an upwardly projecting annular flange 24, a removable screen bottom 29 for the percolator, a percolator cover 23 closely and removably fitted on said upwardly projecting flange 24, a second screen 27 removably mounted on said cover, a pipe section 20 secured to said cover and opening through the upper portion of said cover, and having a flaring lower end fitting over the projecting end of said vertical pipe 18 and adapted to receive therefrom heated water from said vessel and deliver the same within said percolator; and a removable cover 15 for said outer vessel, substantially as described.

FRANK L. LANDERGREN.

Witnesses:
M. G. CRAWFORD,
H. S. MACKAYE.